US012804558B2

(12) United States Patent
Kishida et al.

(10) Patent No.: US 12,804,558 B2
(45) Date of Patent: Nov. 17, 2026

(54) TERMINAL APPARATUS AND TRANSMISSION METHOD FOR RADIO FRAME TRANSMISSION UNDER TRANSMISSION POWER REGULATION

(71) Applicant: NTT, Inc., Tokyo (JP)

(72) Inventors: Akira Kishida, Musashino (JP); Kengo Nagata, Musashino (JP); Shoko Shinohara, Musashino (JP); Hanae Otani, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 285 days.

(21) Appl. No.: 18/684,192

(22) PCT Filed: Aug. 18, 2021

(86) PCT No.: PCT/JP2021/030179

§ 371 (c)(1),
(2) Date: Feb. 16, 2024

(87) PCT Pub. No.: WO2023/021611

PCT Pub. Date: Feb. 23, 2023

(65) Prior Publication Data

US 2025/0024382 A1 Jan. 16, 2025

(51) Int. Cl.

| | |
|---|---|
| ***H04W 52/36*** | (2009.01) |
| ***H04L 1/00*** | (2006.01) |
| ***H04W 52/42*** | (2009.01) |

(52) U.S. Cl.

CPC ........... *H04W 52/36* (2013.01); *H04L 1/0003* (2013.01); *H04W 52/42* (2013.01)

(58) Field of Classification Search

None

See application file for complete search history.

(56) References Cited

U.S. PATENT DOCUMENTS

| | | | | |
|---|---|---|---|---|
| 9,560,545 | B1 * | 1/2017 | Zhou | H04B 7/15542 |
| 2005/0143119 | A1 * | 6/2005 | Chandra | H04W 52/288 455/67.11 |
| 2014/0225458 | A1 * | 8/2014 | Rehm | H02J 50/12 307/149 |
| 2021/0391961 | A1 * | 12/2021 | Cao | H04L 1/08 |

OTHER PUBLICATIONS

IEEE, "Part 11: Wireless LAN Medium Access Control (MAC) and Physical Layer (PHY) Specifications", IEEE Computer Society, IEEE Std 802.11™—2016, Dec. 7, 2016, downloaded on Feb. 20, 2017, 2 pages.

Notification of Transmittal of Translation of the International Preliminary Report on Patentability mailed Feb. 29, 2024, in International Application No. PCT/JP2021/030179, 5 pages.

* cited by examiner

*Primary Examiner* — Anh Ngoc M Nguyen

(74) *Attorney, Agent, or Firm* — XSENSUS LLP

(57) ABSTRACT

A terminal apparatus includes a determination unit and a transmission unit. The determination unit determines a target of transmission power regulation based on a beacon frame. The transmission unit, in a case where it is determined that the target of regulation is not a transmission power density, transmits a first frame in a first frequency band, and in a case where it is determined that the target of regulation is a transmission power density, transmits a second frame which is a duplicate of the first frame in a second frequency band while transmitting the first frame in the first frequency band.

8 Claims, 11 Drawing Sheets

Fig. 10

| | | | | | |
|---|---|---|---|---|---|
| ... | Country IE | Power Constraint IE | ... | TRANSMISSION POWER REGULATION IDENTIFIER | ... |

TERMINAL APPARATUS AND TRANSMISSION METHOD FOR RADIO FRAME TRANSMISSION UNDER TRANSMISSION POWER REGULATION

CROSS-REFERENCE TO RELATED APPLICATION

The present application is based on PCT filing PCT/JP2021/030179, filed Aug. 18, 2021, the entire contents of which is incorporated herein by reference.

TECHNICAL FIELD

An embodiment relates to a terminal, a transmission method, and a transmission program.

BACKGROUND ART

A wireless Local Area Network (LAN) is known as a system for wirelessly connecting an access point and a terminal apparatus. The terminal apparatus located in the communication area of the access point can access a network via the access point through a wireless LAN.

CITATION LIST

Non Patent Literature

[NPL 1] IEEE Std 802.11-2016, "19.3.11.12 Non-HT Duplicate Transmission", Dec. 7, 2016

SUMMARY OF INVENTION

Technical Problem

However, communication between the access point and the terminal apparatus becomes unstable in an area where the base station access point is far from the terminal apparatus. In addition, the transmission capability of a terminal apparatus is lower than the transmission capability of an access point in most cases. For this reason, communication tends to become unstable particularly in uplink.

The present invention has been made in view of the circumstances, and aims to provide a stable wireless communication environment in an area where an access point is far from a terminal apparatus.

Solution to Problem

A terminal apparatus according to an aspect includes a determination unit and a transmission unit. The determination unit determines a target of transmission power regulation based on a beacon frame. In a case where a target of transmission power regulation is determined to be a transmission power density, the transmission unit transmits a first frame in a first frequency band and further transmits a second frame which is a duplicate of the first frame in a second frequency band.

Advantageous Effects of Invention

According to an embodiment, a stable wireless communication environment can be provided in an area where an access point is far from a terminal apparatus.

BRIEF DESCRIPTION OF DRAWINGS

FIG. 10 is a diagram illustrating an example of a format of a beacon frame among radio frames according to a modification.

DESCRIPTION OF EMBODIMENTS

Embodiments will be described below with reference to the drawings. Further, in the description below, components that have the same functions and configurations are denoted by the same reference signs.

1. Embodiment 1.1 Configuration

A configuration of a communication system according to an embodiment will be described.

1.1.1 Communication System

Figure 1:
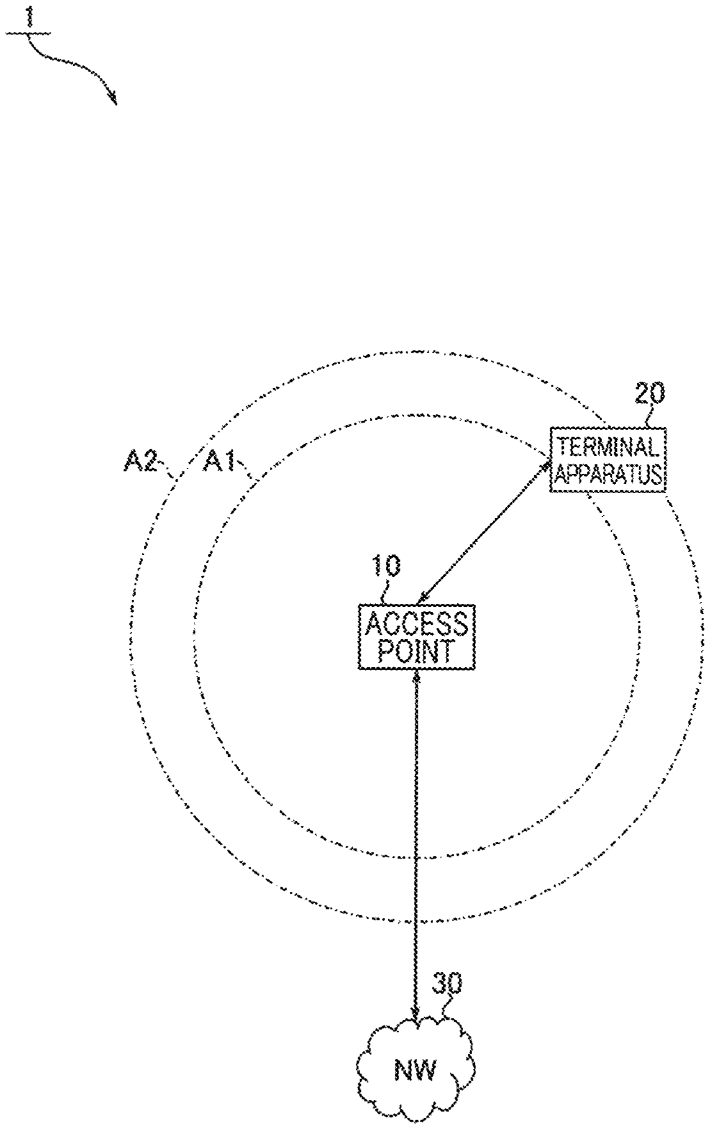
FIG. 1 is a schematic diagram illustrating a configuration of a communication system according to an embodiment.

FIG. 1 is a block diagram illustrating an example of a configuration of a communication system according to an embodiment.

As illustrated in FIG. 1, a communication system 1 includes an access point 10, a terminal apparatus 20, and a network 30.

The access point 10 is, for example, a base station of a wireless LAN. The access point 10 is configured to communicate with a server (not shown) on the network 30 by wire or wirelessly. The access point 10 is configured to communicate with the terminal apparatus 20 by radio. Communication between the access point 10 and the terminal apparatus 20 is based on, for example, the IEEE 802.11 standard.

The terminal apparatus 20 is a wireless terminal apparatus, for example, a smartphone, a personal computer (PC), or the like. The terminal apparatus 20 may also be another electronic device such as an Internet-of-Things (IoT) device. The terminal apparatus 20 can communicate with a server on the network 30 via the access point 10.

An area where the terminal apparatus 20 can communicate with the access point 10 changes depending on transmission conditions of a wireless signal transmitted from the terminal apparatus 20. For example, areas A1 and A2 that extends from the access point 10 are defined. The area A1 is an area where transmission from the terminal apparatus 20 to the access point 10 is possible. The area A2 is an area where transmission from the access point 10 to the terminal apparatus 20 is possible. The area A2 is larger than the area A1 because the access point 10 uses radio components having a higher performance than those of the terminal apparatus 20. In a case in which the terminal apparatus 20 is located outside the area A1 and inside the area A2, the terminal apparatus 20 can receive wireless signals from the access point 10 but cannot transmit wireless signals to the access point 10. In order to fill this gap between the access point 10 and the terminal apparatus 20, it is desirable that the terminal apparatus 20 be able to change communication conditions to ensure stable communication with the access point 10 in such a situation.

1.1.2 Hardware Configurations

Next, hardware configurations of the access point and the terminal apparatus in the communication system according to an embodiment will be described.

(Hardware Configuration of Access Point)

Figure 2:
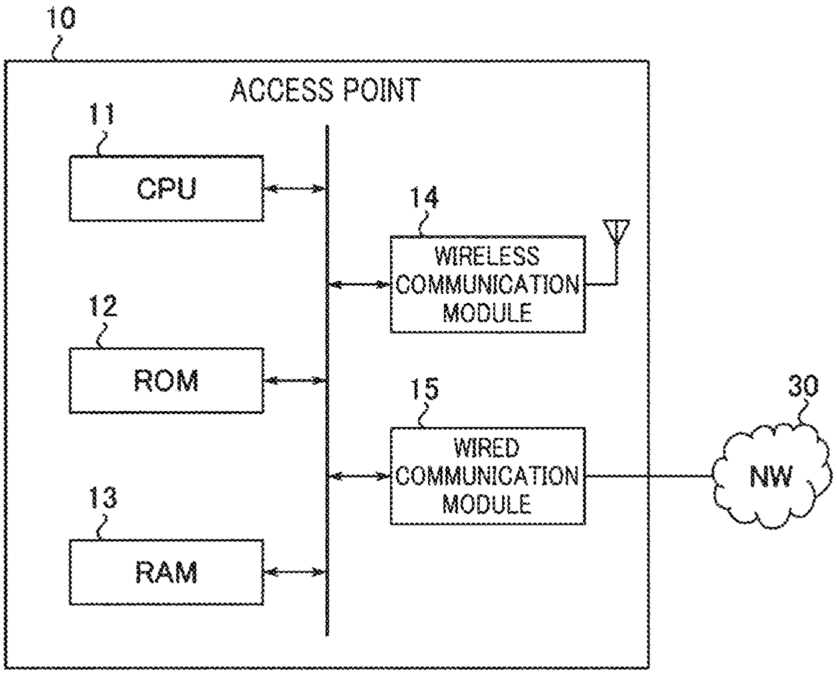
FIG. 2 is a block diagram illustrating an example of a hardware configuration of an access point according to the embodiment.

FIG. 2 is a block diagram illustrating an example of a hardware configuration of the access point according to the embodiment.

As illustrated in FIG. 2, the access point 10 includes, for example, a central processing unit (CPU) 11, a read only memory (ROM) 12, a random access memory (RAM) 13, a wireless communication module 14, and a wired communication module 15.

The CPU 11 is a processing circuit that controls overall operations of the access point 10. The ROM 12 is a non-volatile semiconductor memory, for example. The ROM 12 stores programs and control data for controlling the access point 10. The RAM 13 is a volatile semiconductor memory, for example. The RAM 13 is used as a work area of the CPU 11. The wireless communication module 14 is a circuit used for transmission and reception of data based on wireless signals. The wireless communication module 14 is connected to an antenna. The wired communication module 15 is a circuit used for transmission and reception of data based on wired signals. The wired communication module 15 is connected to the network 30.

Figure 3:
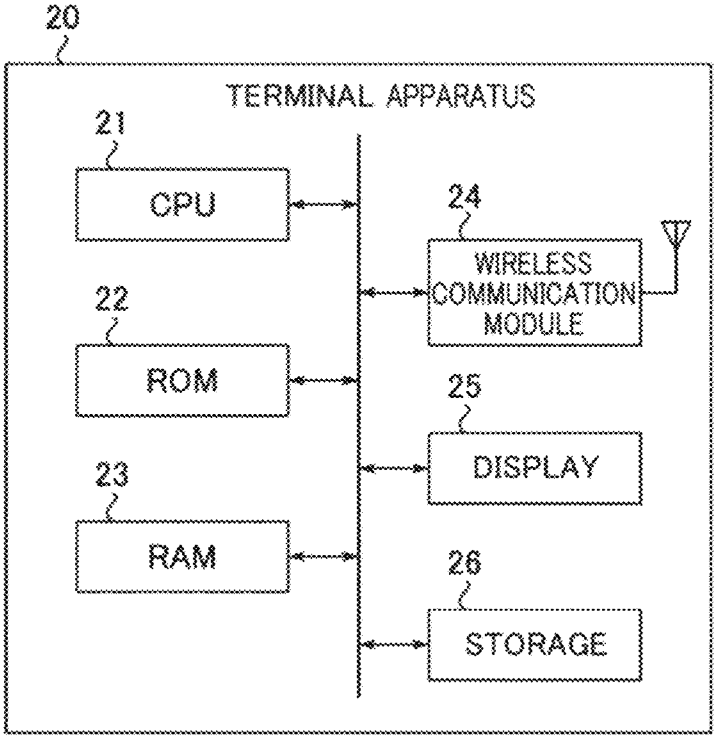
FIG. 3 is a block diagram illustrating an example of a hardware configuration of a terminal apparatus according to the embodiment.

(Hardware Configuration of Terminal) FIG. 3 is a block diagram illustrating an example of a hardware configuration of the terminal apparatus according to the embodiment.

As illustrated in FIG. 3, the terminal apparatus 20 includes, for example, a CPU 21, a ROM 22, a RAM 23, a wireless communication module 24, a display 25, and a storage 26.

The CPU 21 is a processing circuit that controls overall operations of the terminal apparatus 20. The ROM 22 is a non-volatile semiconductor memory, for example. The ROM 22 stores programs and data for controlling the terminal apparatus 20. The RAM 23 is a volatile semiconductor memory, for example. The RAM 23 is used as a work area of the CPU 21. The wireless communication module 24 is a circuit used for transmission and reception of data based on wireless signals. The wireless communication module 24 is connected to an antenna. The display 25 is, for example, a liquid crystal display (LCD) or an electro-luminescence (EL) display. The display 25 displays a graphical user interface (GUI) corresponding to application software, and the like. The storage 26 is a non-volatile storage device. The storage 26 stores system software of the terminal apparatus 20 and the like.

1.1.3 Functional Configurations

Next, functional configurations of the access point and the terminal apparatus in the communication system according to the embodiment will be described.

(Communication Function)

The access point 10 and the terminal apparatus 20 have communication functions, for example, based on an open systems interconnection (OSI) reference model. In the OSI reference model, communication functions are divided into seven layers (Layer 1: physical layer, Layer 2: data link layer, Layer 3: network layer, Layer 4: transport layer, Layer 5: session layer, Layer 6: presentation layer, and Layer 7: application layer). In the present specification, Layer 3 to Layer 7 will be referred to as "upper layers" with the data link layer that is Layer 2 as a reference. The data link layer includes a Logical Link Control (LLC) layer and a Media Access Control (MAC) layer. In the LLC layer, a Destination Service Access Point (DSAP) header, a Source Service Access Point (SSAP) header, or the like is added to data input from an application in the upper layer, and thereby an LLC packet is generated. In the MAC layer, a MAC frame is formed by adding a MAC header to the LLC packet. In the physical layer, a radio frame is generated by adding a preamble or the like to the MAC frame. The radio frame is also called a physical layer (PHY) protocol data unit (PPDU).

Figure 4:
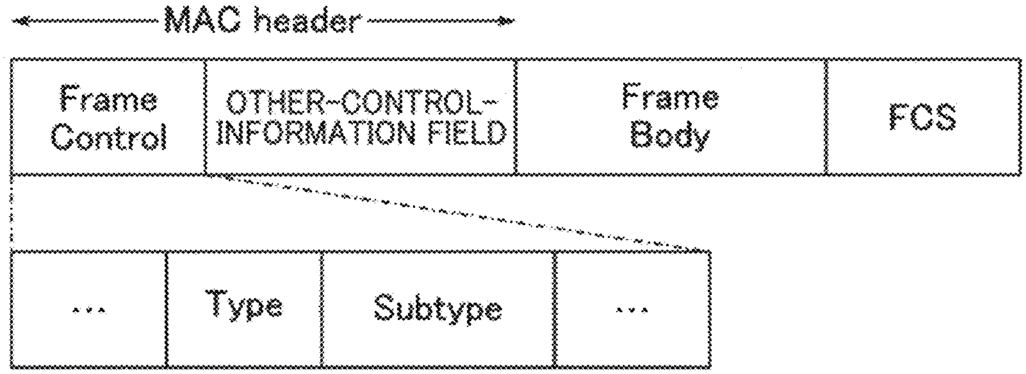
FIG. 4 is a diagram illustrating an example of a format of a MAC frame according to the embodiment.

FIG. 4 is a diagram illustrating an example of a format of a MAC frame generated by the access point and the terminal apparatus according to the embodiment.

As illustrated in FIG. 4, the MAC frame includes, a Frame Control field, an other-control-information field, a Frame Body field, and a Frame Check Sequence (FCS) field. The Frame Control field and the other-control-information field correspond to a MAC header. The Frame Body field corresponds to a MAC payload. The FCS field is information added in order to detect a frame error.

The Frame Control field includes a Type value and a Subtype value.

The Type value and the Subtype value indicate the frame type of the MAC frame. Specifically, for example, the Type value "00" indicates that the MAC frame is a management frame. A Type value "01" indicates that the MAC frame is a control frame. A Type value "11" indicates that the MAC frame is a data frame. In addition, the content of the MAC frame changes depending on a combination of a Type value and a Subtype value. Specifically, for example, a combination of a Type value "00" and a Subtype value "1000" indicates that the management frame is a beacon frame.

Figure 5:
FIG. 5 is a diagram illustrating an example of a format of a beacon frame according to the embodiment.

FIG. 5 is a diagram illustrating an example of a format of a beacon frame according to the embodiment. In FIG. 5, an example of information elements (IEs) included in the Frame Body field of the beacon frame is illustrated.

As illustrated in FIG. 5, the beacon frame includes a Country IE and a Power Constraint IE.

The Country IE is an element including information indicating a region and a country where the access point 10 is disposed and information indicating a maximum transmission power.

The Power Constraint IE is an information element indicating a limit value of transmission power to be imposed on the region where the access point 10 is disposed. An upper limit value of transmission power to be imposed on the region where the access point 10 is disposed can be calculated by using the Country IE and Power Constraint IE. Specifically, the upper limit value of the transmission power is "(maximum transmission power of the Country IE)-(limit value of the transmission power of the Power Constraint IE)". The upper limit value of transmission power may vary depending on a target of transmission power regulation. For example, when a target of transmission power regulation is a total transmission power, the upper limit value of the transmission power indicates the upper limit value of the total transmission power. In addition, for example, when a target of transmission power regulation is a transmission power density, the upper limit value of the transmission power indicates the upper limit value of the transmission power per unit frequency band. The unit frequency band may be the unit of channel. The unit frequency band may be the unit of subcarrier.

(Functional Configuration of Access Point)

Figure 6:
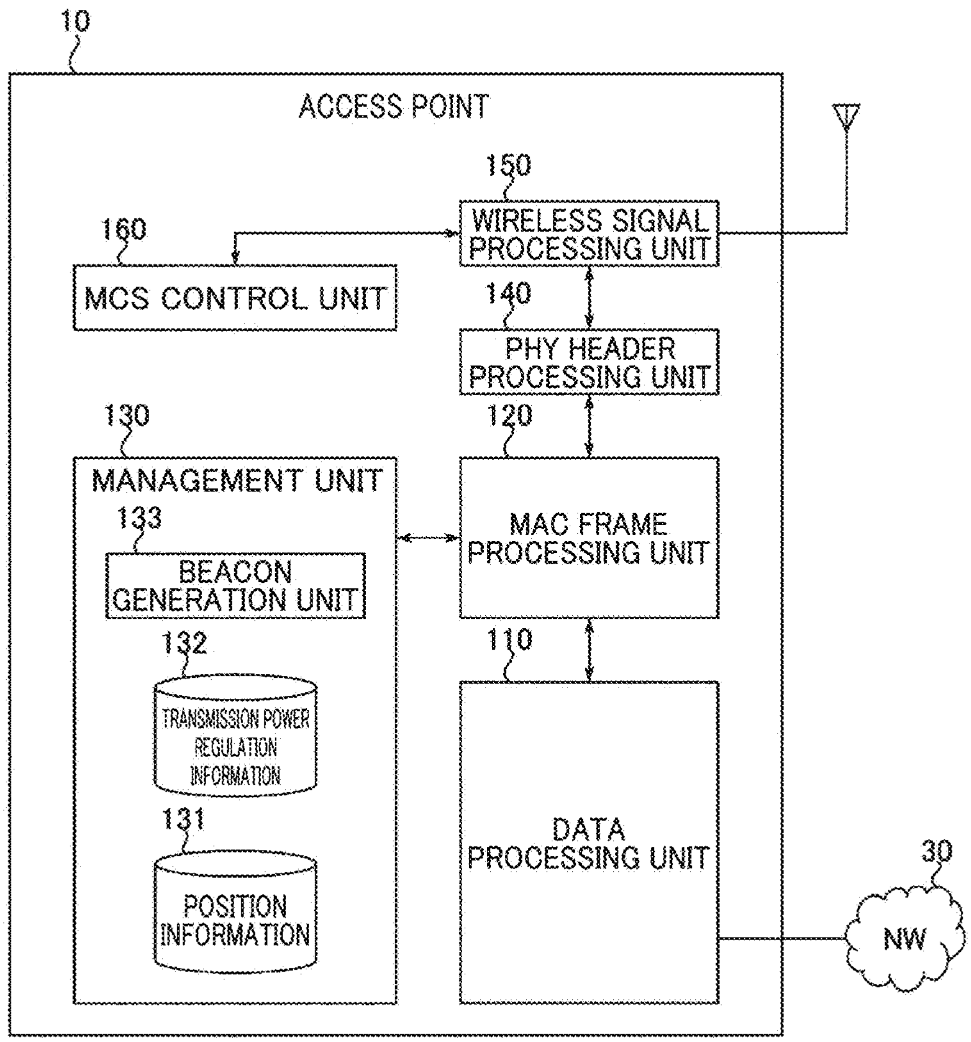
FIG. 6 is a block diagram illustrating an example of a functional configuration of the base station access point according to the embodiment.

FIG. 6 is a block diagram illustrating an example of a functional configuration of the access point according to the embodiment.

As illustrated in FIG. 6, the access point 10 functions as a computer that includes a data processing unit 110, a MAC frame processing unit 120, a management unit 130, a PHY header processing unit 140, a wireless signal processing unit 150, and a MCS control unit 160.

The data processing unit 110 is a functional block that executes processing corresponding to the LLC layer and the upper layers. When the access point 10 is a transmitting station, the data processing unit 110 generates the Frame Body field of the data frame based on data received from the network 30, and transmits the Frame Body field to the MAC frame processing unit 120. When the access point 10 is a receiving station, the data processing unit 110 extracts data from the Frame Body field of the data frame received from the MAC frame processing unit 120, and transmits the data to the network 30.

The MAC frame processing unit 120 is a functional block that executes processing corresponding to the MAC layer. When the access point 10 is a transmitting station, the MAC frame processing unit 120 generates a MAC frame based on the Frame Body field received from the data processing unit 110 and the management unit 130. When the access point 10 is a receiving station, the MAC frame processing unit 120 extracts the Frame Body field from the MAC frame received from the PHY header processing unit 140, and transmits the Frame Body field to the data processing unit 110.

The management unit 130 is a functional block that manages a beacon frame. The management unit 130 stores position information 131 and transmission power regulation information 132. In addition, the management unit 130 includes a beacon generation unit 133.

The position information 131 is information indicating a region and a country where the access point 10 is disposed.

The transmission power regulation information 132 is information related to regulation of transmission power imposed in the region where the access point 10 is disposed. Specifically, the transmission power regulation information 132 includes information indicating the presence or absence of regulations on transmission power. When there is a regulation on transmission power, the transmission power regulation information 132 further includes information for identifying a target of transmission power regulation.

For example, when a target of regulation is a total transmission power, an upper limit value of the total transmission power is stored as the transmission power regulation information 132. In addition, for example, when a target of regulation is a transmission power density, an upper limit value of the transmission power per unit frequency band is stored as the transmission power regulation information 132.

Further, the position information 131 and the transmission power regulation information 132 may be preset by a manager. The transmission power regulation information 132 may store information acquired by the management unit 130 from the network 30 based on the position information 131.

The beacon generation unit 133 is a functional block that generates a Frame Body field of a beacon frame. The beacon generation unit 133 generates a Country IE of a beacon frame based on the position information 131. The beacon generation unit 133 generates a Power Constraint IE of the beacon frame based on the transmission power regulation information 132. The beacon generation unit 133 transmits the Frame Body field of the beacon frame including the Country IE and the Power Constraint IE to the MAC frame processing unit 120.

The PHY header processing unit 140 is a functional block that executes processing corresponding to the physical layer. When the access point 10 is a transmitting station, the PHY header processing unit 140 generates a radio frame based on the MAC frame received from the MAC frame processing unit 120. When the access point 10 is a receiving station, the PHY header processing unit 140 extracts a MAC frame from radio frames received from the wireless signal processing unit 150, and transmits the MAC frame to the MAC frame processing unit 120.

The wireless signal processing unit 150 is a functional block that serves as an interface with an antenna. When the access point 10 is a transmitting station, the wireless signal processing unit 150 converts a radio frame received from the PHY header processing unit 140 into a wireless signal based on a Modulation and Coding Scheme (MCS) selected by the MCS control unit 160. Examples of processing of converting the radio frame into the wireless signal include, for example, convolution encoding processing, interleaving processing, subcarrier modulation processing, inverse fast Fourier Transform processing, orthogonal frequency division multiplexing (OFDM) modulation processing, and frequency conversion processing. When the access point 10 is a receiving station, the wireless signal processing unit 150 converts a wireless signal received from the antenna into a radio frame based on the MCS selected by the MCS control unit 160. Examples of processing of converting the wireless signal into the radio frame include, for example, frequency conversion processing, OFDM demodulation processing, fast Fourier Transform processing, subcarrier demodulation processing, deinterleaving processing, and Viterbi decoding processing.

The MCS control unit 160 is a functional block that selects a MCS used by the wireless signal processing unit 150 for conversion processing. The MCS control unit 160 selects a MCS based on reception power. Examples of MCS include, for example, a modulation scheme, an encoding rate, the number of subcarriers, a guard interval length, the number of Multi-Input and Multi-Output (MIMO) multiplexed signals, and transmit power.

(Functional Configuration of Terminal)

Figure 7:
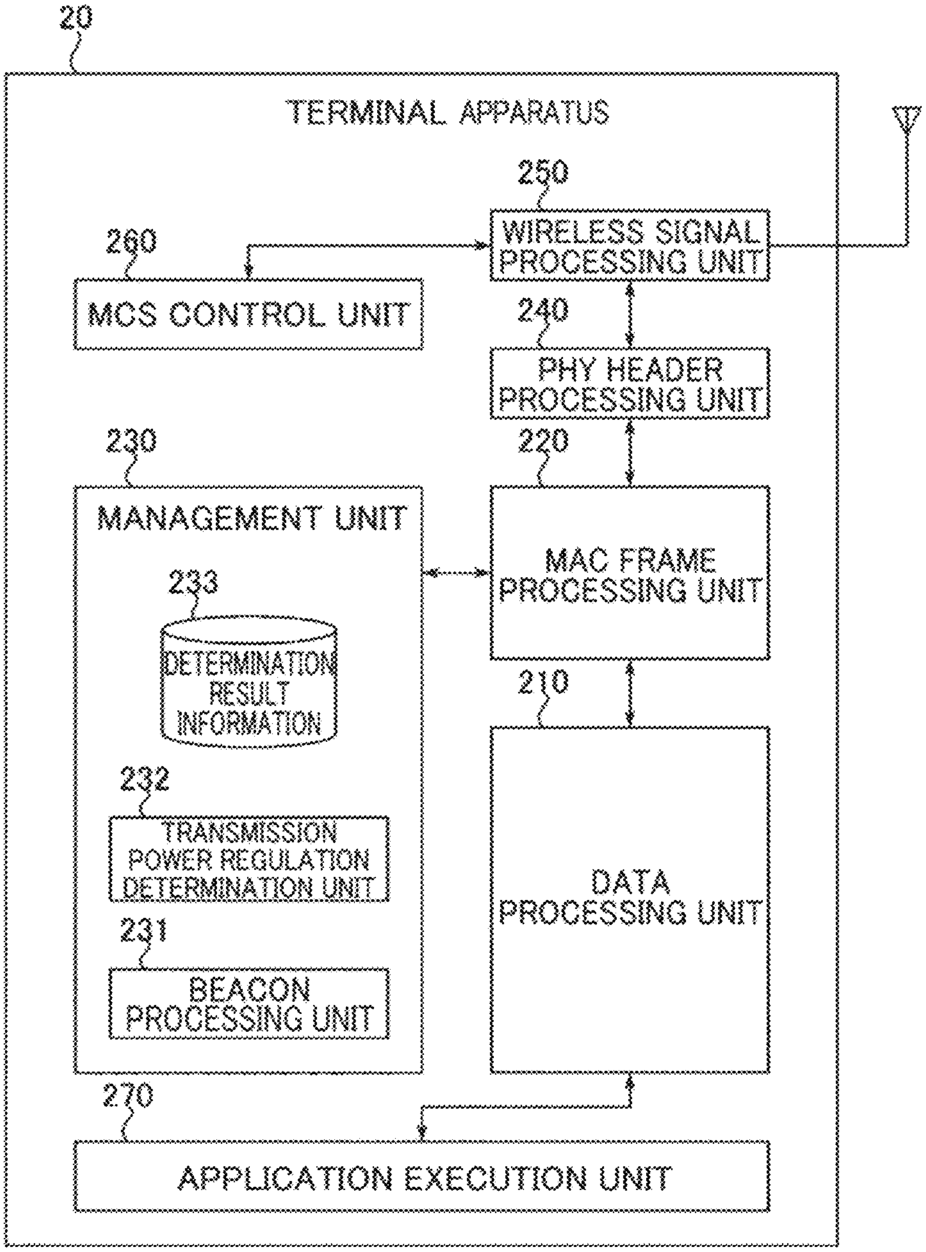
FIG. 7 is a block diagram illustrating an example of a functional configuration of the terminal apparatus according to the embodiment.

FIG. 7 is a block diagram illustrating an example of a functional configuration of the terminal apparatus according to the embodiment.

As illustrated in FIG. 7, the terminal apparatus 20 functions as a computer that includes a data processing unit 210, a MAC frame processing unit 220, a management unit 230, a PHY header processing unit 240, a wireless signal processing unit 250, a MCS control unit 260, and an application execution unit 270.

The data processing unit 210 is a functional block that executes processing corresponding to the LLC layer and the upper layers. When the terminal apparatus 20 is a transmitting station, the data processing unit 210 generates a Frame Body field of a data frame based on data received from the application execution unit 270, and transmits the Frame Body field to the MAC frame processing unit 220. When the terminal apparatus 20 is a receiving station, the data processing unit 210 extracts data from the Frame Body field of the data frame received from the MAC frame processing unit 220, and transmits the data to the application execution unit 270.

The MAC frame processing unit 220 is a functional block that executes processing corresponding to the MAC layer. When the terminal apparatus 20 is a transmitting station, the MAC frame processing unit 220 generates a MAC frame based on the Frame Body field received from the data processing unit 210. When the terminal apparatus 20 is a receiving station, the MAC frame processing unit 220 extracts the Frame Body field from the MAC frame received from the PHY header processing unit 240. When the MAC frame is a data frame, the MAC frame processing unit 220 transmits the extracted Frame Body field to the data processing unit 210. When the MAC frame is a beacon frame, the MAC frame processing unit 220 transmits the extracted Frame Body field to the management unit 230.

The management unit 230 is a functional block that manages beacon frames. The management unit 230 includes a beacon processing unit 231 and a transmission power regulation determination unit 232. The management unit 230 stores determination result information 233.

The beacon processing unit 231 extracts a Country IE and a Power Constraint IE from the Frame Body field of the beacon frame received from the MAC frame processing unit 220. The beacon processing unit 231 transmits the extracted Country IE and Power Constraint IE to the transmission power regulation determination unit 232.

The transmission power regulation determination unit 232 acquires a target of transmission power regulation in the region where the access point 10 is disposed from the network 30 via the access point 10 based on the Country IE received from the beacon processing unit 231. Specifically, the transmission power regulation determination unit 232 acquires information to identify which of the total transmission power and the transmission power density is to be regulated. The transmission power regulation determination unit 232 determines whether a target of maximum transmission power regulation in the Country IE received from the beacon processing unit 231 is the total transmission power or the transmission power per unit frequency band based on the acquired information. According to the result of the determination, the transmission power regulation determination unit 232 calculates an upper limit value of the total transmission power when the target of regulation is the total transmission power, and an upper limit value of the transmission power per unit frequency band when the target of regulation is the transmission power per unit frequency band. The transmission power regulation determination unit 232 stores the results of the determination and calculation as the determination result information 233.

The PHY header processing unit 240 is a functional block that executes processing corresponding to the physical layer. When the terminal apparatus 20 is a transmitting station, the PHY header processing unit 240 generates a radio frame based on the MAC frame received from the MAC frame processing unit 220. When the terminal apparatus 20 is a receiving station, the PHY header processing unit 240 extracts a MAC frame from radio frames received from the wireless signal processing unit 250, and transmits the MAC frame to the MAC frame processing unit 220.

The wireless signal processing unit 250 is a functional block that serves as an interface with an antenna. When the terminal apparatus 20 is a transmitting station, the wireless signal processing unit 250 converts a radio frame received from the PHY header processing unit 240 into a wireless signal based on the MCS selected by the MCS control unit 260. When the terminal apparatus 20 is a receiving station, the wireless signal processing unit 250 converts a wireless signal received from the antenna into a radio frame based on the MCS selected by the MCS control unit 260. The conversion processing is similar to that of the access point 10.

The MCS control unit 260 is a functional block that selects a MCS used by the wireless signal processing unit 250 for conversion processing. The MCS control unit 260 selects a MCS based on reception power and the determination result information 233. When selecting a MCS, the MCS control unit 260 also selects a frequency band.

The application execution unit 270 is a functional block that executes an application. The application execution unit 270 executes an application based on data received from the data processing unit 210. For example, the application execution unit 270 can display information on the application on the display 25. Furthermore, the application execution unit 270 can operate based on an operation of an input interface.

1.2 Operations

Next, operations of the terminal apparatus according to the embodiment will be described.

1.2.1 Transmission Power Regulation Determination Operation

A transmission power regulation determination operation by the terminal apparatus according to an embodiment will be described. The transmission power regulation determination operation is included in an operation of the terminal apparatus 20 to receive a wireless signal from the access point 10.

Figure 8:
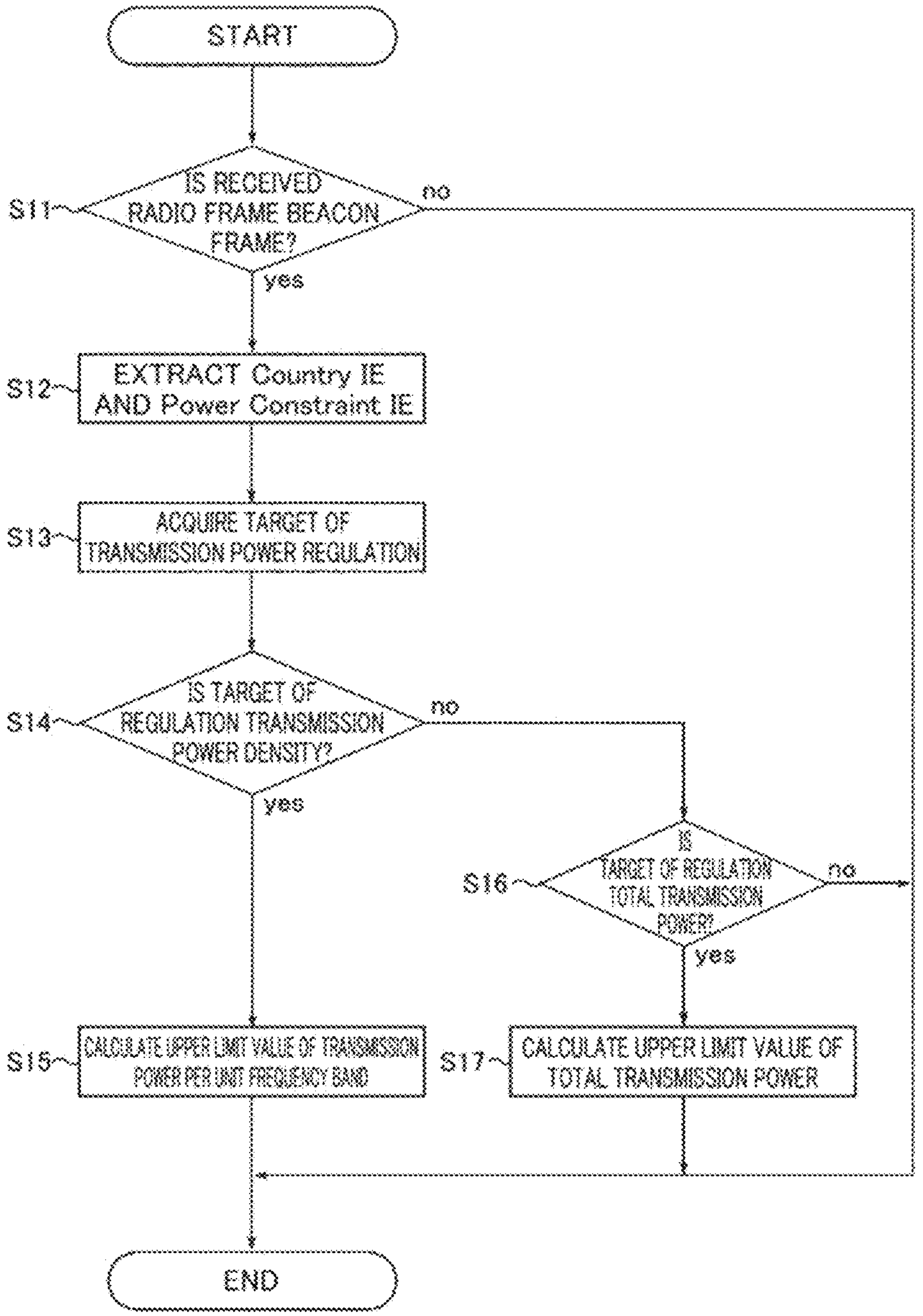
FIG. 8 is a flowchart illustrating an example of a transmission power regulation determination operation in the terminal apparatus according to the embodiment.

FIG. 8 is a flowchart showing an example of the transmission power regulation determination operation in the terminal apparatus according to the embodiment.

When a wireless signal from the access point 10 is received (started), the wireless signal processing unit 250 converts the received wireless signal into a radio frame. The PHY header processing unit 240 extracts a MAC frame from the radio frame. The MAC frame processing unit 220 determines whether the extracted MAC frame is a beacon frame (S11).

If the MAC frame is a beacon frame (S11; Yes), the beacon processing unit 231 extracts the Country IE and the Power Constraint IE from the Frame Body field of the beacon frame (S12).

The transmission power regulation determination unit 232 acquires information on whether a target of transmission power regulation is a total transmission power or a transmission power density from the network 30 via the access point 10 based on the Country IE extracted in the processing of S12 (S13).

The transmission power regulation determination unit 232 determines whether the target of transmission power regulation acquired in the processing of S13 is a transmission power density (S14).

If the target of regulation is the transmission power density (S14; Yes), the transmission power regulation determination unit 232 determines that the target of maximum transmission power regulation of the Country IE extracted in the processing of S12 is the transmission power per unit frequency band. The transmission power regulation determination unit 232 calculates the upper limit value of the transmission power per unit frequency band based on the Country IE and the Power Constraint IE (S15). The transmission power regulation determination unit 232 stores, as the determination result information 233, the target of regulation being the transmission power per unit frequency band and the upper limit value of the transmission power per unit frequency band.

If the target of regulation is not a transmission power density (S14; No), the transmission power regulation determination unit 232 determines whether the target of transmission power regulation acquired in the processing of S13 is a total transmission power (S16).

If the target of regulation is the transmission power density (S16; Yes), the transmission power regulation determination unit 232 determines that the target of maximum transmission power regulation of the Country IE extracted in the processing of S12 is the total transmission power. The transmission power regulation determination unit 232 calculates the upper limit value of the total transmission power based on the Country IE and the Power Constraint IE (S17). The transmission power regulation determination unit 232 stores the target of regulation being the total transmission power and the upper limit value of the total transmission power as the determination result information 233.

After the processing of S15, after the processing of S17, if the target of regulation is not a total transmission power (S16; No), or if the received radio frame is not a beacon frame (S11; No), the transmission power regulation determination operation ends (end).

With the operation as described above, the terminal apparatus 20 can recognize what regulation is imposed on the transmission power based on the information notified from the access point 10.

1.2.2 Frequency Band Control Operation

Next, a frequency band control operation by the terminal apparatus according to an embodiment will be described. The frequency band control operation is included in a MCS control operation in the operation of the terminal apparatus 20 to transmit a wireless signal to the access point 10.

Figure 9:
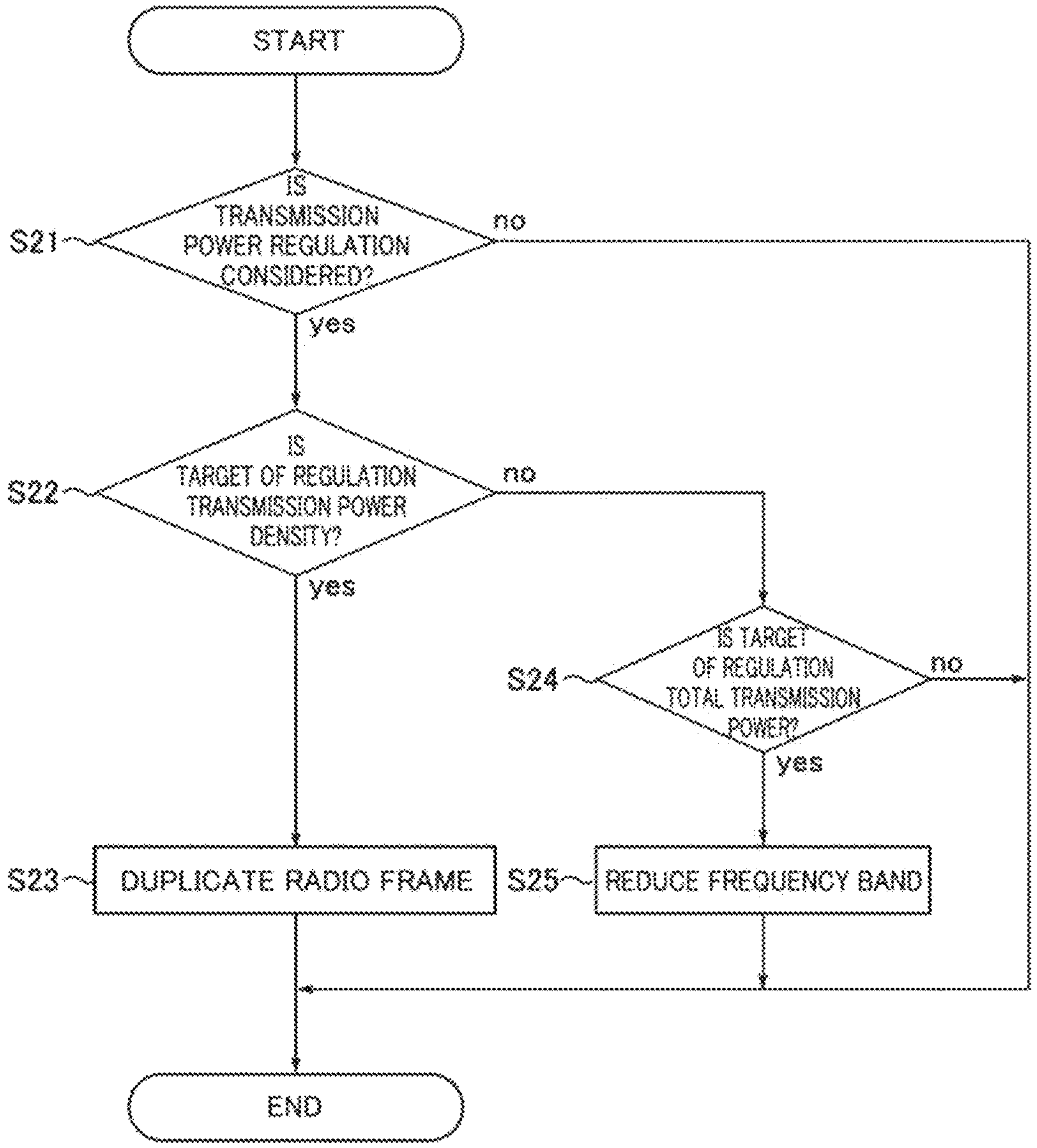
FIG. 9 is a flowchart showing an example of a frequency band control operation in the terminal apparatus according to the embodiment.

FIG. 9 is a flowchart showing an example of the frequency band control operation in the terminal apparatus according to the embodiment. In the example shown in FIG. 9, it is assumed that the transmission power regulation determination operation is executed in advance, and thus the determination result information 233 is stored.

When selecting a MCS (start), the MCS control unit 260 determines whether to consider a transmission power regulation (S21). For example, the MCS control unit 260 determines that a transmission power regulation is taken into consideration when the reception power of the access point 10 is lower than a threshold. The MCS control unit 260 determines that no transmission power regulation is taken into consideration when the reception power of the access point 10 is not lower than the threshold.

If a transmission power regulation is considered (S21; Yes), the MCS control unit 260 determines whether the target of regulation is a transmission power density based on the determination result information 233 (S22).

If the target of regulation is the transmission power density (S22; Yes), the MCS control unit 260 determines to duplicate radio frames (S23). Then, the MCS control unit 260 controls the MAC frame processing unit 220, the PHY header processing unit 240 and the wireless signal processing unit 250 such that radio frames to be duplicated and duplicated radio frames are transmitted on a plurality of channels in parallel. This transmission method is also called non-High Throughput (HT) duplicate transmission. Here, it does not manner whether a radio frame to be duplicated is a data frame, a management frame, or a control frame. Further, the transmission power is controlled so as to be as high as possible within a range not exceeding the upper limit value of the transmission power per unit frequency band. Thus, the same data can be transmitted with a higher total transmission power than when radio frames are not duplicated.

If the target of regulation is not a transmission power density (S21; No), the MCS control unit 260 determines whether the target of regulation is a total transmission power based on the determination result information 233 (S24).

If the target of regulation is a total transmission power (S24; Yes), the MCS control unit 260 determines that the frequency band is reduced (S24). Specifically, for example, the MCS control unit 260 controls the MAC frame processing unit 220, the PHY header processing unit 240, and the wireless signal processing unit 250 such that a wireless signal is transmitted by reducing the number of subcarriers more than when the frequency band control operation is not performed. Specifically, for example, as many subcarriers as about half or one third of the subcarriers used when the frequency band control operation is not performed are used. Further, the transmission power is controlled such that the transmission power becomes as greater as possible within a range not exceeding the upper limit value of the total transmission power. That is, the transmission power per unit frequency band is controlled such that the transmission power is greater than that in the case in which the frequency band control operation is not performed. Thus, the same data can be transmitted with a higher transmission power density than in the case in which the frequency band is not reduced.

After the processing of S23, after the processing of S25, or if transmission power regulation is not taken into consideration (S21; No), the frequency band control operation ends (end).

1.3 Effects According to Present Embodiment

According to the embodiment, the transmission power regulation determination unit 232 determines a target of transmission power regulation based on the Country IE in a beacon frame. If it is determined that the target of regulation is a transmission power density, the MCS control unit 260 determines to generate a second frame which is a duplicate of a first frame when the first frame is transmitted. The MAC frame processing unit 220, the PHY header processing unit 240, and the wireless signal processing unit 250 transmit the first frame in a first frequency band (first channel) based on the determination and further transmit the second frame in a second frequency band (second channel). Thus, the terminal apparatus 20 can transmit a plurality of radio frames including the same data in parallel by a plurality of channels while complying with the regulation of the transmission power density. Thus, the access point 10 can obtain the effect of frequency diversity in comparison with the case in which a radio frame is not duplicated when a wireless signal is received from the terminal apparatus 20. Thus, even when the terminal apparatus 20 is located in an area far from the access point 10, a more stable wireless communication environment can be provided.

In addition, if the target of regulation is determined to be a total transmission power, the MCS control unit 260 determines that the frequency band used in transmitting a third frame is reduced from a third frequency band to a fourth frequency band. Specifically, the MCS control unit 260 determines that the first number of subcarriers that is smaller than the second number of subcarriers is used in a certain channel. Based on the determination, the MAC frame processing unit 220, the PHY header processing unit 240, and the wireless signal processing unit 250 transmit the third frame using the fourth frequency band (the first number of subcarriers). Thus, the terminal apparatus 20 can enhance the transmission power density of the radio frame compared to the case where the third frequency band is used while complying with the regulation of the total transmission power. Thus, even when the terminal apparatus 20 is located in an area far from the access point 10, a more stable wireless communication environment can be provided.

2. Modifications

Further, various modifications can be made from the above-described embodiment. For example, although the case in which the beacon frame does not include information indicating what is the target of regulation has been described in the above embodiment, the present invention is not limited thereto. The access point 10 may generate a beacon frame including information indicating what the target of regulation is.

Figure 10:
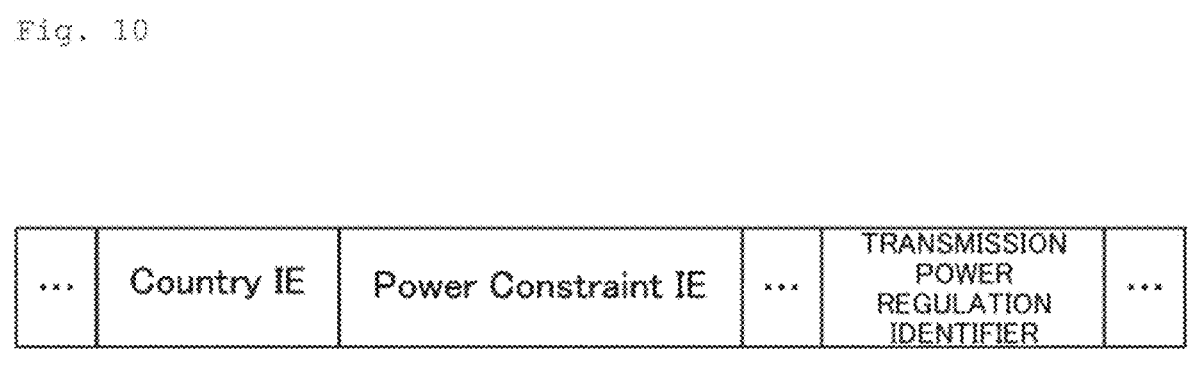

FIG. 10 is a diagram illustrating an example of a format of a beacon frame according to a modification. FIG. 10 corresponds to FIG. 5 for the embodiment.

As shown in FIG. 10, the beacon frame may further include a transmission power regulation identifier in addition to the Country IE and Power Constraint IE.

The transmission power regulation identifier is, for example, an information element for identifying whether a target of transmission power regulation is a transmission power density or a total transmission power.

Thus, the transmission power regulation determination unit 232 receives a beacon frame to determine whether a target of maximum transmission power regulation of the Country IE is a transmission power per unit frequency band or a total transmission power.

Figure 11:
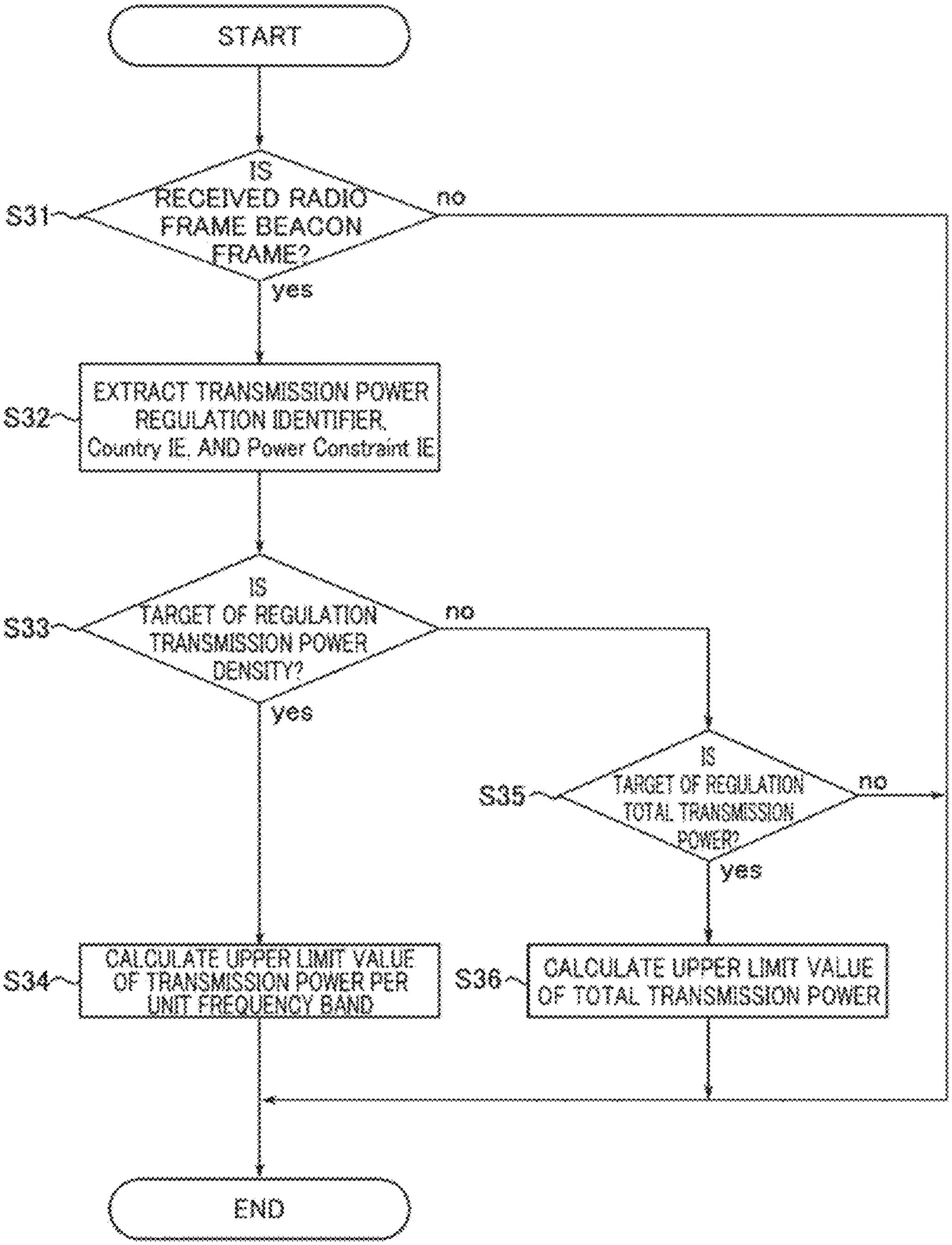
FIG. 11 is a flowchart showing an example of a transmission power regulation determination operation in the terminal apparatus according to the modification.

FIG. 11 is a flowchart showing an example of a transmission power regulation determination operation by the terminal apparatus according to the modification. FIG. 11 corresponds to FIG. 8 for the embodiment.

When a wireless signal is received from the access point 10 (start), the wireless signal processing unit 250 converts the received wireless signal into a radio frame. The PHY header processing unit 240 extracts the MAC frame from the radio frame. The MAC frame processing unit 220 determines whether the extracted MAC frame is a beacon frame (S31).

If the MAC frame is a beacon frame (S31; Yes), the beacon processing unit 231 extracts the transmission power regulation identifier, the Country IE, and the Power Constraint IE from the Frame Body field of the beacon frame (S32).

The transmission power regulation determination unit 232 determines whether the target of regulation is a transmission power density based on the transmission power regulation identifier extracted in the processing of S32 (S33).

If the target of regulation is a transmission power density (S33; Yes), the transmission power regulation determination unit 232 determines that the target of maximum transmission power regulation of the Country IE extracted in the processing of S32 is the transmission power per unit frequency band. The transmission power regulation determination unit 232 calculates the upper limit value of the transmission power per unit frequency band based on the Country IE and the Power Constraint IE (S34).

If the target of regulation is not a transmission power density (S33; No), the transmission power regulation determination unit 232 determines whether the target of regulation is a total transmission power based on the transmission power regulation identifier extracted in the processing of S32 (S35).

If the target of regulation is the total transmission power (S35; Yes), the transmission power regulation determination unit 232 determines that the target of maximum transmission power regulation of the Country IE extracted in the processing of S32 is the total transmission power. The transmission power regulation determination unit 232 calculates the upper limit value of the total transmission power based on the Country IE and the Power Constraint IE (S36).

After the processing of S34, after the processing of S36, if the target of regulation is not a total transmission power (S35; No), or if the received radio frame is not a beacon frame (S31; No), the transmission power regulation determination operation ends (end).

With the operation as described above, the terminal apparatus 20 can recognize what regulation is imposed with respect to transmission power without accessing the network 30.

3. Others

In addition, each processing operation in the above-described embodiments and modifications can be stored as a program which can be executed by a processor serving as a computer. In addition, the program can be stored and distributed in a storage medium of an external storage device such as a magnetic disk, an optical disc, or a semiconductor memory. In addition, the processor can then load the program stored in the storage medium of the external storage device and execute the above-described processing by controlling the operation performed by the loaded program.

Further, the present invention is not limited to the embodiments described above and can be variously modified at the implementation stage within a scope not departing from the gist of the present invention. In addition, each of the embodiments may be combined as appropriate, and in such a case, combined effects can be achieved. Furthermore, the embodiments described above include various aspects of the invention, and the various aspects of the invention can be extracted from combinations selected from a plurality of disclosed constituent elements. For example, even when some of all of the constituent elements disclosed in the embodiments are deleted, a configuration from which the constituent elements are deleted can be extracted as an aspect of the invention as long as the problem can be solved and the effects can be obtained.

REFERENCE SIGNS LIST

1 Communication system
10 Access point
20 Terminal apparatus
30 Network
11, 21 CPU
12, 22 ROM
13, 23 RAM
14, 24 Wireless communication module
15 Wired communication module
25 Display
26 Storage
110, 210 Data processing unit
120, 220 MAC frame processing unit
130, 230 Management unit
140, 240 PHY header processing unit

150, 250 Wireless signal processing unit
160, 260 MCS control unit
270 Application execution unit
131 Position information
132 Transmission power regulation information
133 Beacon generation unit
231 Beacon processing unit
232 Transmission power regulation determination unit
233 Determination result information
A1, A2 Area

The invention claimed is:

1. A terminal apparatus, comprising:
determination circuitry configured to determine whether a transmission power regulation exists or not and a target of the transmission power regulation is a transmission power density or a total transmission power based on a beacon frame; and
a transmitter configured to select one of transmission modes including a first transmission mode and a second transmission mode based on a determination by the determination circuitry, wherein
the first transmission mode includes transmitting a first frame in a first frequency band in response to a first determination that the transmission power regulation does not exist, and
the second transmission mode includes transmitting a second frame which is a duplicate of the first frame in a second frequency band while transmitting the first frame in the first frequency band in response to a second determination that the transmission power regulation exists and the target is the transmission power density.

2. The terminal apparatus according to claim 1, wherein the transmitter transmits the first frame and the second frame such that each of a first transmission power density in the first frequency band and a second transmission power density in the second frequency band is equal to or less than a first threshold.

3. The terminal apparatus according to claim 1, wherein the transmission modes further include a third transmission mode,
the third transmission mode includes transmitting the first frame in a third frequency band that is narrower than the first frequency band in response to a third determination that the transmission power regulation exists and the target is the total transmission power.

4. The terminal apparatus according to claim 3, wherein the third frequency band is included in the first frequency band.

5. The terminal apparatus according to claim 3, wherein the number of first subcarriers in the third frequency band is smaller than the number of second subcarriers in the first frequency band.

6. The terminal apparatus according to claim 3, wherein a transmission power density in transmission of the first frame is higher when the third frequency band is used than when the first frequency band is used.

7. A transmission method, comprising:
determining whether a transmission power regulation exists or not and a target of the transmission power regulation is a transmission power density or a total transmission power based on a beacon frame; and
selecting one of transmission modes including a first transmission mode and a second transmission mode based on a determination, wherein
the first transmission mode includes transmitting a first frame in a first frequency band in response to a first determination that the transmission power regulation does not exist, and
the second transmission mode includes transmitting a second frame which is a duplicate of the first frame in a second frequency band while transmitting the first frame in the first frequency band in response to a second determination that the transmission power regulation exists and the target is the transmission power density.

8. A non-transitory computer-readable storage medium storing computer executable instructions which, when executed by a terminal apparatus, cause the terminal apparatus to:
determine whether a transmission power regulation exists or not and a target of the transmission power regulation is a transmission power density or a total transmission power based on a beacon frame; and
select one of transmission modes including a first transmission mode and a second transmission mode based on a determination, wherein
the first transmission mode includes transmitting a first frame in a first frequency band in response to a first determination that the transmission power regulation does not exist, and
the second transmission mode includes transmitting a second frame which is a duplicate of the first frame in a second frequency band while transmitting the first frame in the first frequency band in response to a second determination that the transmission power regulation exists and the target is the transmission power density.

* * * * *